UNITED STATES PATENT OFFICE.

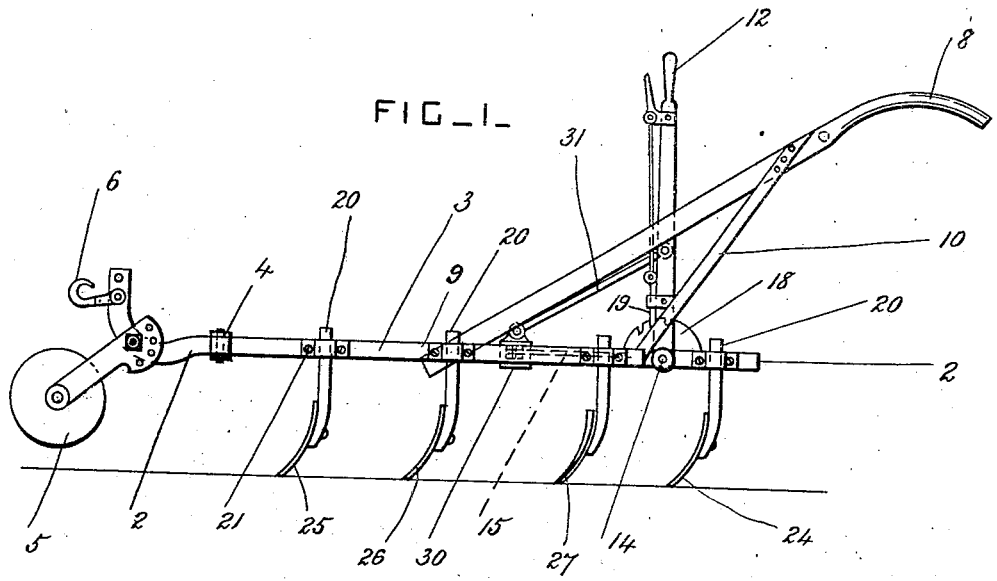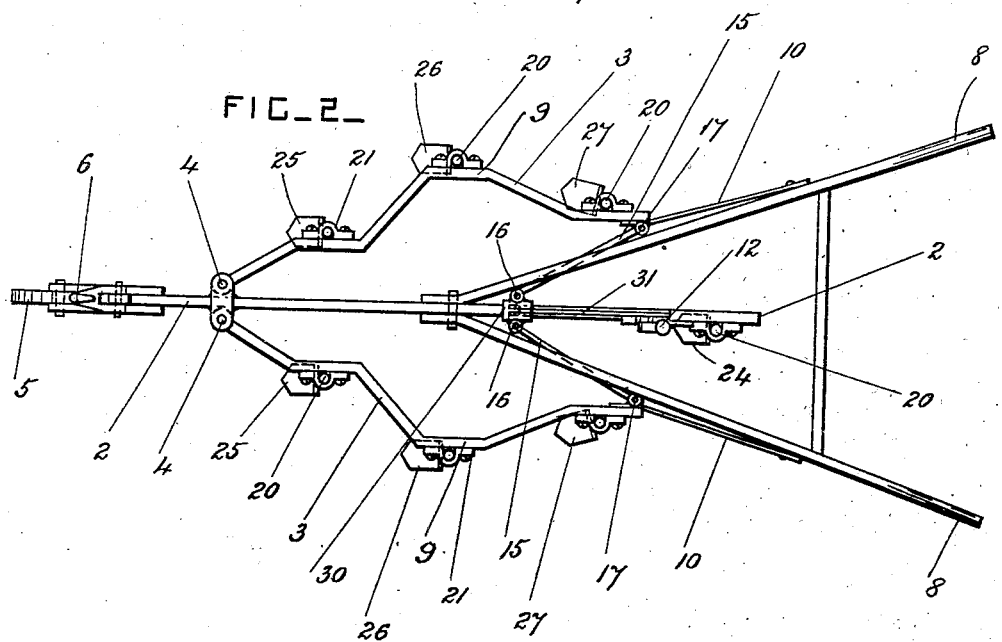

CLAYTON J. GIFFORD, OF MANTON, MICHIGAN.

CULTIVATOR.

1,336,217.

Specification of Letters Patent.   Patented Apr. 6, 1920.

Application filed November 25, 1919. Serial No. 340,469.

*To all whom it may concern:*

Be it known that I, CLAYTON J. GIFFORD, a citizen of the United States, residing at Manton, in the county of Wexford and State of Michigan, have invented certain new and useful Improvements in Cultivators, of which the following is a specification.

This invention relates to cultivators for growing plants; and it consists in the novel construction and combination of the parts hereinafter fully described and claimed whereby the implement is specially adapted to cultivate the whole of the space between two adjacent rows of plants, to turn over the soil close to the roots of the plants without injuring them, and to close the furrows formed adjacent to the roots so that the soil around them does not dry out quickly.

In the drawings, Figure 1 is a side view of a cultivator constructed according to this invention. Fig. 2 is a plan view of the same.

The frame of the cultivator is provided with a single center bar 2, and two side bars 3 the front end portions of which are pivoted to the center bar by vertical pins 4. The center bar projects a little in front of the pivot pins 4, and it is provided with a front ground wheel 5 and a draft attachment 6, both of which are preferably adjustable and of any approved construction. Handles 8 for guiding the implement are attached to the center bar 2 and project upwardly and rearwardly.

The front and rear end portions of the two side bars 3 are arranged substantially parallel to each other and are set at different distances apart with respect to the center bar 2. The middle portions 9 of the side bars are offset with respect to their end portions, and are wider apart than the rear end portions. The center bar 2 is straight and is longer than the side bars. Stays 10 of spring metal are secured to the handle bars and to the rear end portions of the side bars and center bar so as to connect these parts together and permit the side bars to be moved pivotally and also to permit the height of the handles above the ground to be varied.

The side bars 3 are moved pivotally by means of a hand lever 12, which is pivoted by a pin 14 to the center bar 2. Two outwardly inclined links 15 are pivoted to a shoe 30 by pins 16 and to the side bars by pins 17. The shoe 30 is slidable on the center bar 2, and is connected pivotally with the hand lever 12 by a connecting-rod 31. A toothed quadrant 18 is provided and is secured to the center bar 2, and 19 is a catch carried by the hand lever and adapted to engage with the quadrant 18.

Cultivating blades are provided and each blade has a substantially vertical shank 20 which is secured to the frame by a clamp 21 of approved construction, so that each blade may be adjusted vertically by sliding its shank up and down in its clamp, and may also be adjusted pivotally by turning its shank axially in its clamp. The center bar 2 has a single cultivating blade 24 connected to its rear end portion beyond the ends of the side bars. The side bars 3 have a pair of blades 25 connected to their front end portions, and they have a similar pair of blades 26 connected to their offset middle portions 9 and set wider apart than the front blades 25.

The rear end portions of the side bars 3 have a pair of blades 27 connected to them, and set apart so as to form furrows in the ground intermediate of the furrows formed by the blades 25 and 26. The blades 27 are cultivating blades similar to the blades 25 and 26, but their shanks are set axially so that the blades 27 are inclined and so that the dirt is thrown outwardly to close the furrows made by the two blades 26 next in front of them, and which are the widest apart of all the pairs of blades.

The implement is drawn along between two adjacent rows of plants, and the side bars are set pivotally so that the blades 26 will cultivate as closely as possible to the roots of the plants without injuriously pruning them. The rear pair of blades 27 operate to close the furrows made by the blades 26, and move the soil toward the roots so that the soil does not dry out quickly close to the roots.

The handles at the rear end of the implement enable the operator to have a complete control of its course, so that it does not sway sidewise, and so that its blades cut furrows of the same depth at each side of the machine. The cultivating blades are spaced apart so that the whole surface of the ground between the two adjacent rows of plants is effectively cultivated and freed from weeds.

What I claim is:

In a cultivator, a frame provided with a center bar and two side bars pivoted to the center bar at their front ends and having offset portions at their middle parts, a single cultivator blade connected to the rear end portion of the center bar beyond the ends of the side bars, a pair of furrow forming blades connected to the front end portions of the side bars, a pair of similar furrow forming blades connected to the offset portions of the side bars and arranged at a greater distance apart than the blades in front of them, a pair of outwardly inclined blades connected to the rear end portions of the said side bars and spaced nearer together than the blades which are set the widest apart and operating to close the furrows made by them, and means for adjusting the said side bars pivotally to vary the distance apart of the blades connected to them.

In testimony whereof I have affixed my signature.

CLAYTON J. GIFFORD.